(12) United States Patent
Tanaka

(10) Patent No.: US 7,821,491 B2
(45) Date of Patent: Oct. 26, 2010

(54) LED DRIVER CIRCUIT FOR A BACKLIGHT DEVICE

(75) Inventor: Shinichi Tanaka, Tokyo (JP)

(73) Assignee: Texas Instruments Incorporated, Dallas, TX (US)

(*) Notice: Subject to any disclaimer, the term of this patent is extended or adjusted under 35 U.S.C. 154(b) by 350 days.

(21) Appl. No.: 12/114,021

(22) Filed: May 2, 2008

(65) Prior Publication Data
US 2009/0256497 A1 Oct. 15, 2009

(30) Foreign Application Priority Data
May 2, 2007 (JP) .............................. 2007-121485

(51) Int. Cl.
*G09G 3/36* (2006.01)
(52) U.S. Cl. .................. 345/102; 315/169.2; 315/169.3; 315/291; 315/308
(58) Field of Classification Search .................. 315/160, 315/169.2, 169.3, 291, 299, 307, 308; 345/82, 345/87, 88, 102
See application file for complete search history.

(56) References Cited

U.S. PATENT DOCUMENTS

| | | | |
|---|---|---|---|
| 7,307,614 B2* | 12/2007 | Vinn | 345/102 |
| 7,495,397 B2* | 2/2009 | Okabe | 315/169.1 |
| 2004/0124889 A1* | 7/2004 | Koharagi et al. | 327/108 |

* cited by examiner

*Primary Examiner*—Thuy Vinh Tran
(74) *Attorney, Agent, or Firm*—William B. Kempler; Wade J. Brady, III; Frederick J. Telecky, Jr.

(57) ABSTRACT

A backlight device that is not affected by offset voltage. Driving transistor (41) operates such that current flows in LED circuit (11), and the detection voltage generated by current detector (42) and the reference voltage are input alternately to first input transistor (30a) and second input transistor (30b) of amplifier (20). Brightness adjusting switch (43) operates such that when driving transistor (41) is turned OFF during the OFF period of LED circuit (11), for example, during the horizontal blanking interval or vertical blanking interval, the detection voltage and the reference voltage are swapped, so that the average voltage generated in current detector (42) is equal to the reference voltage, and the effect of the offset voltage can be eliminated.

20 Claims, 3 Drawing Sheets

LED DRIVER CIRCUIT FOR A BACKLIGHT DEVICE

FIELD OF THE INVENTION

The present invention pertains to a type of backlight device for a liquid crystal display. More specifically, the present invention pertains to the LED driver in the backlight device.

LEDs have a long lifetime and low power consumption, so that they have become attractive for use in backlighting liquid crystals. In recent years, they have been adopted not only in liquid crystal displays of cell phones, but also in TVs.

When LEDs are used as backlights, plural LED elements are connected in series to form an LED circuit. Plural LED circuits are distributed on the back surface of the liquid crystal display element, and the light emitted from the LED circuits serving as light-emitting circuits is scattered by a diffusion plate to obtain a uniform brightness in the liquid crystal display. When the backlight is composed of LEDs, white LEDs may be used, or red (R) LEDs, green (G) LEDs and blue (B) LEDs may be used to obtain white light.

In FIG. 4, 111 represents an LED circuit comprising LEDs connected in series. For said LED circuit 111, one end is connected to power voltage line Ea, and the other end is connected to the drain terminal of driving transistor 141. When driving transistor 141 is turned ON, current flows in LED circuit 111, so that light is emitted.

The source terminal of driving transistor 141 is connected to current detecting resistor 142, and the current flowing in LED circuit 111 flows to current detecting resistor 142.

The gate terminal of driving transistor 141 is connected to the output terminal of amplifier 120.

The LED backlight device shown in FIG. 4 is provided with reference to voltage circuit 114. Reference voltage VR output from reference voltage circuit 114 and detection voltage VS generated by current detecting resistor 142 are input to the respective input terminals of amplifier 120. Said driving transistor 141, current detecting resistor 142 and amplifier 120 comprise a negative feedback circuit. Said driving transistor 141 allows current flow in LED circuit 111 such that detection voltage VS generated by current detecting resistor 142 is equal to reference voltage VR output from reference voltage circuit 114.

In this case, when the same reference voltage VR is input to various amplifiers 120 connected to LED circuits 111, the same magnitude of current flows in said LED circuits 111 and the generated brightness is uniform.

However, offset voltage Vof is present in input transistors (130a), (130b) of amplifier 120, and an error voltage is contained in the output voltage of amplifier 120. As a result, detection voltage VS generated by current detecting resistor 142 is not equal to reference voltage VR, and the currents flowing in LED circuits 111 of amplifiers 120 differ from each other, leading to uneven brightness. This is undesirable.

In FIG. 4, 143 represents a switch for adjusting the brightness. It switches driving transistor 141, making it possible to change the brightness of LED circuit 111 by adjusting the ratio of the ON/OFF periods of driving transistor 141. That is, LED circuit is in PWM light modulation driving mode.

BACKGROUND OF THE INVENTION

A general object of the present invention is to reduce or solve the aforementioned problems of the prior art by providing a type of backlight device characterized by the fact that it is free of the influence of the offset voltage of the differential amplifier.

This and other objects and features are provided, in accordance with an aspect of by a backlight device having an LED circuit, a driving transistor and a current detector; when said driving transistor is turned ON by the output signal of said amplifier, current flows in said LED circuit, said driving transistor, and said current detector; the detection voltage generated by said current detector according to said current and a reference voltage are input to said amplifier, and said driving transistor utilizes said amplifier to perform control such that the voltage differential between said detection voltage and said reference voltage is reduced; said amplifier comprises a first input transistor and a second input transistor whose source terminals are connected to each other, a load circuit connected to the drain terminals of said first input transistor and second input transistor, an input exchange circuit that inputs said detection voltage to the gate terminal of at least one input transistor among said first input transistor and second input transistor, and inputs said reference voltage to at least the other input transistor, and an exchange controller, which is connected to said input exchange circuit, controls said input exchange circuit, causes said detection voltage to be input to the input transistor having said reference voltage input to it among said first input transistor and said second input transistor, and causes said reference voltage to be input to the input transistor having said detection voltage input to it.

According to an aspect of the present invention, said load circuit has a first load transistor and a second load transistor that have their gate terminals connected to each other and have their drain terminals connected to the drain terminals of said first transistor and said second transistor, respectively; it has an output exchange circuit which causes the drain terminals and gate terminals of said first load transistor and second load transistor to be connected to each other or disconnected from each other.

According to an aspect of the present invention, said reference voltage and said detection voltage input to said first input transistor and said second input transistor are swapped at least once per 1/60 sec under the control of said exchange controller.

In addition, the backlight device of the present invention may have a brightness adjusting switch, which is arranged between said amplifier and the gate terminal of said driving transistor, and which switches the connection state between said amplifier and said driving transistor ON/OFF, and a brightness controller, which controls the operation of said brightness adjusting switch; said exchange controller is constituted such that said detection voltage and said reference voltage input to said first input transistor and second input transistor are swapped during the period when the connection between said amplifier and said driving transistor is turned OFF.

According to an aspect of the present invention a type of light-emitting element driver is provided which driver serves to drive the light-emitting element for backlighting a display, and it has the following parts: a transistor, which is coupled to the current path of the light-emitting element and controls power ON for the light-emitting element, a detector, which is coupled to the current path of the light-emitting element and detects the current flowing in the light-emitting element, a driving signal generator, into which the detection voltage generated by said detector and a reference voltage are input, and which generates a driving signal for driving said transistor, and a switching circuit, which is coupled between said driving signal generator and said transistor, and which selectively feeds said driving signal to the control terminal of said transistor; said driving signal generator has the following parts: a first input terminal and a second input terminal, an output terminal, a differential circuit containing a first transistor and a second transistor, a load circuit coupled to said differential circuit, a first switching circuit containing a first switch that causes the control terminal of said first transistor to be connected to said first input terminal or said second input terminal, and a second switch that causes the control terminal of said second transistor to be connected to said second input terminal or said first input terminal, and a second switching circuit containing a third switch that receives the output signal fed from the first node or second node between said differential circuit and said load circuit, and sends it to said output terminal; the connection states of said first switch, second switch and third switch are switched during OFF period of the light-emitting element.

According to an aspect of the present invention, each period comprising the ON/OFF periods of the light-emitting element is synchronized with the horizontal synchronization signal or vertical synchronization signal of the display control signal.

REFERENCE NUMERALS AND SYMBOLS AS SHOWN IN THE DRAWINGS

In the figures 10 represents an LED backlight device, 11, $11_1$-$11_7$ represent a LED circuit, 13 represents an exchange controller, 20 represents an amplifier, 23 represents a load circuit, 26 represents an output exchange circuit, 27 represents an input exchange circuit, 30a, 30b represent first and second input transistors, 31a, 31b represent first and second load transistors, 41 represents a driving transistor, 42 represents a current detector, 43 represents a brightness adjusting switch.

DESCRIPTION OF THE EMBODIMENTS

Because the input transistors of the differential amplifier are swapped, the error voltage of the output voltage is cancelled, and it is possible to eliminate the influence of the offset voltage. When exchange is also performed for the load transistors together with the input transistors, it is possible to eliminate output voltage error due to differences in the characteristics of the load transistors. Because exchange is performed during the vertical blanking interval, the brightness is not affected by the exchange.

Figure 1:
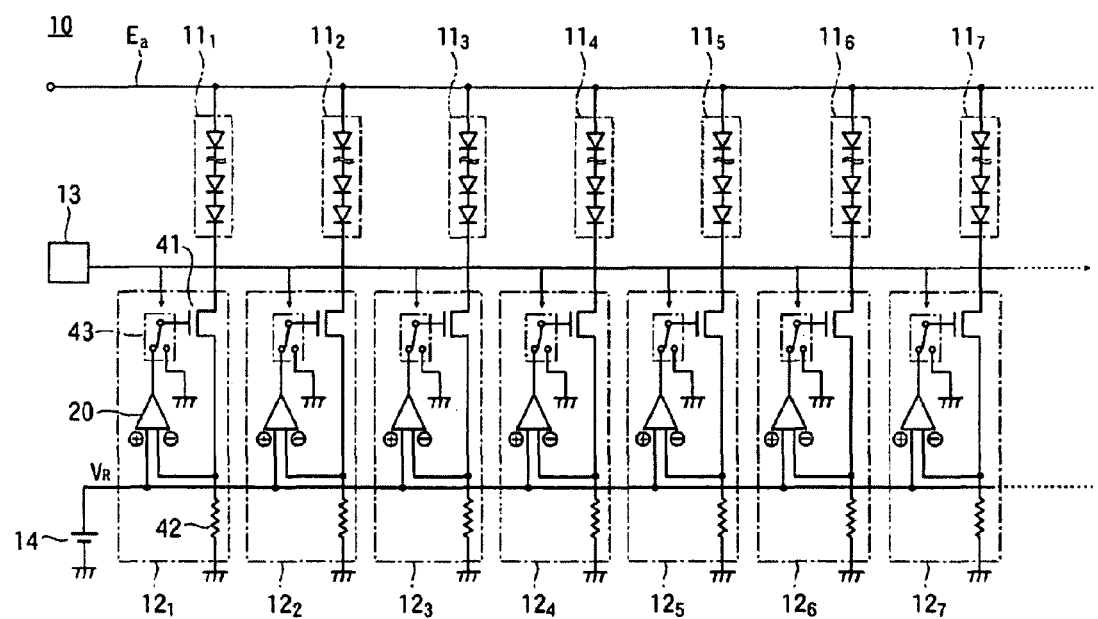
FIG. 1 is a block diagram illustrating the backlight device of the present invention.

In FIG. 1, 10 represents the LED backlight device of the present invention. It is arranged on the back surface of a liquid crystal element.

Said LED backlight device 10 has LED circuits $11_1$-$11_7$ comprising plural LEDs connected in series. When LED circuits $11_1$-$11_7$ are turned ON, they illuminate the liquid crystal element from the back surface. In order to obtain white light for the backlight, a combination of three LEDs comprising red (R), green (G) and blue (B) LEDs, may be used, or white LEDs may be used. Said LED circuits $11_1$-$11_7$ have LED drivers $12_1$-$12_7$ provided for turning ON LED circuits $11_1$-$11_7$, respectively. Said LED drivers $12_1$-$12_7$ have the same constitution, and in the following, the internal structure indicated by 12 in FIG. 2 will be explained.

Figure 2:
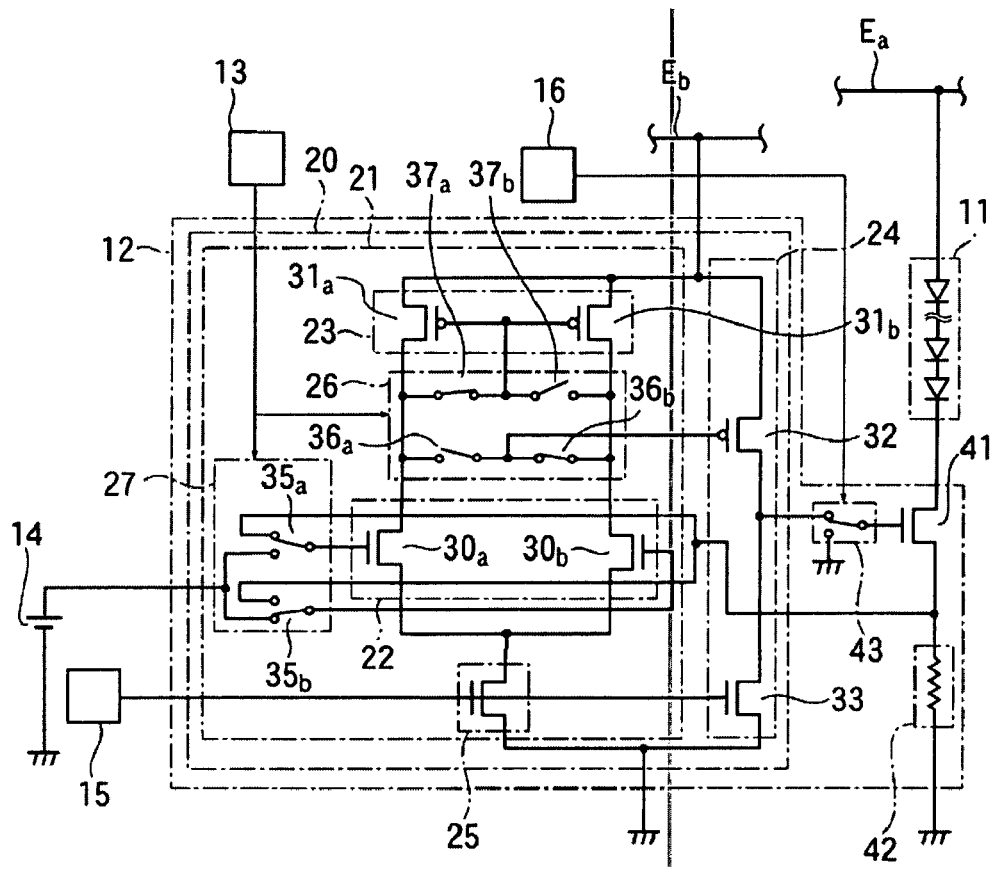
FIG. 2 is a circuit diagram illustrating the LED driver.

As shown in FIG. 2, LED driver 12 comprises driving transistor 41, current detector 42, amplifier 20, and brightness adjusting switch 43.

One end of said LED circuits $11_1$-$11_7$ is connected to power feed voltage line Ea, and the other end is connected to ground potential via driving transistor 41 and current detector 42. Said driving transistor 41 is an n-channel MOS transistor. Brightness adjusting switch 43 is arranged at its gate terminal. Said brightness adjusting switch 43 either connects the gate terminal of driving transistor 41 to the output terminal of amplifier 20, or disconnects it from amplifier 20 and connects to ground potential. Here, brightness adjusting switch 43 has the gate terminal of driving transistor 41 connected to the output terminal of amplifier 20 so that the voltage output from amplifier 20 is input and driving transistor 41 is controlled by output voltage Vout of amplifier 20.

When driving transistor 41 is turned ON by amplifier 20, a voltage is applied between the two ends of LED circuits $11_1$-$11_7$ so that current flows in LED circuits $11_1$-$11_7$. Said current flows through the various LED elements connected in series causing them to emit light. The current flowing in LED circuits $11_1$-$11_7$ flows to current detector 42, and current detector 42 generates detection voltage VS whose magnitude is proportional to the magnitude of said current.

For example, current detector 42 is constituted of a resistance element connected between the source terminal of driving transistor 41 and ground potential.

Reference voltage circuit 14 is provided in LED backlight device 10. The reference voltage VR output from said reference voltage circuit 14 and detection voltage VS output from current detector 42 are input to the non-inverted input terminal and inverted input terminal of amplifier 20, respectively. Said driving transistor 41 performs control such that detection voltage VS generated by current detector 42 and reference voltage VR are equal to each other.

In the following, the internal constitution of amplifier 20 will be explained. Here, amplifier 20 consists of differential amplifier 21 and output circuit 24. It amplifies the difference voltage between reference voltage VR and detection voltage VS by means of differential amplifier 21, and the amplified voltage is output to output circuit 24. The voltage is output from said output circuit 24 via brightness adjusting switch 43 to driving transistor 41.

Said differential amplifier 21 comprises transistor pair circuit 22, load circuit 23, input exchange circuit 27, and output exchange circuit 26. Said transistor pair circuit 22 comprises first input transistor 30a and second input transistor 30b consisting of n-channel MOS transistors. The load circuit has first load transistor 31a and second load transistor 31b consisting of p-channel MOS transistor.

Said input exchange circuit 27 has first input switching element 35a and second input switching element 35b, with said first input switching element 35a and second input switching element 35b being respectively connected to the gate terminals of first input MOS transistor 30a and second input MOS transistor 30b.

Said first input switching element 35a and second input switching element 35b are constituted such that the gate terminals of first input MOS transistor 30a and second input MOS transistor 30b are connected to reference voltage circuit 14 or to current detector 42. As a result, reference voltage VR or detection voltage VS is input to the gate terminals of first input MOS transistor 30a and second input MOS transistor 30b.

The source terminals of said first input transistor 30a and second input transistor 30b are connected to each other, and their drain terminals are respectively connected to the drain terminals of first load transistor 31a and second load transistor 31b. Consequently, the drain terminals of first input transistor 30a and second input transistor 30b are at the same potential as those of first load transistor 31a and second load transistor 31b, respectively. The source terminals of first load transistor 31a and second load transistor 31b are connected to logic circuit voltage line Eb, and the source terminals of first input transistor 30a and second input transistor 30b are connected to differential amplification constant-current circuit 25 (in FIG. 1, logic circuit voltage line Eb and constant-current setting circuit 15, to be explained later, are not shown in the figure).

In this constitution, load circuit 23 and transistor pair circuit 22 are connected in series between logic circuit voltage line Eb and differential amplification constant-current circuit 25.

Said differential amplification constant-current circuit 25 (and output constant-current circuit 33) is connected to constant-current setting circuit 15, and differential amplification constant-current circuit 25 allows a current of the value set by constant-current setting circuit 15 to flow to load circuit 23 and transistor pair circuit 22.

The gate terminals of first load transistor 31a and second load transistor 31b are connected to each other. The structure is such that nearly the same magnitude of current flows in first load transistor 31a and second load transistor 31b. Said load transistors 31a and 31b form a current mirror circuit.

Output exchange circuit 26 comprises first load switch 37a, second load switch 37b, first output switch 36a and second output switch 36b. Said first load switch 37a and second load switch 37b are arranged at the gate terminals of first load transistor 31a and second load transistor 31b, respectively, and first load switch 37a and second load switch 37b make/break the connection between the gate terminal and drain terminal.

Said first output switch 36a and second output switch 36b are arranged between the drain terminals of the first input transistor and the second input transistor and output circuit 24, and they make/break the connection between output circuit 24 and the drain terminals of first input transistor 30a and second input transistor 30b.

Said LED backlight device 10 includes exchange controller 13 that controls input exchange circuit 27 and output exchange circuit 26. According to control by exchange controller 13, first load switch 37a and second load switch 37b operate such that one of the drain terminals of first load transistor 31a and second load transistor 31b is connected to the gate terminal, while the other drain terminal is disconnected from the gate terminal. Also, first output switch 36a and second output switch 36b operate such that of the drain terminals of first load transistor 31a and second load transistor 31b, the drain terminal that has been disconnected from the gate terminal is connected to output circuit 24.

Said output circuit 24 comprises output transistor 32 and output constant-current circuit 33 consisting of p-channel MOS transistors. Said first output switch 36a and second output switch 36b connect the drain terminals of first load transistor 31a and second load transistor 31b to the gate terminal of output transistor 32. The source terminal of output transistor 32 is connected to logic circuit voltage line Eb, and its drain terminal is connected to output constant-current circuit 33.

When brightness adjusting switch 43 connects output circuit 24 and the gate terminal of driving transistor 41, the drain terminal of output transistor 32 is connected via brightness adjusting switch 43 to the gate terminal of driving transistor 41. The amplified signal input to output circuit 24 has its sign inverted and is output from output circuit 24 to the gate terminal of driving transistor 41.

With regard to said first input transistor 30a and second input transistor 30b, the gate terminal of the transistor that has its drain terminal connected to the gate terminals of load transistors 31a and 31b becomes the inverted input terminal of amplifier 20 (the non-inverted input terminal of differential amplifier 21), while the gate terminal of the transistor that has its drain terminal connected to output circuit 24 becomes the non-inverted input terminal of amplifier 20 (inverted input terminal of differential amplifier 21). By means of differential amplifier 21, the difference voltage of detection voltage VS and reference voltage VR is inverted and amplified, and it is inverted again by output circuit 24 with a low output resistance, and is output as the output voltage of amplifier 20.

When detection voltage VS is input to the inverted input terminal of amplifier 20, and reference voltage VR is input to the non-inverted input terminal, amplifier 20, driving transistor 41, and current detector 42 form a negative feedback circuit. When amplifier 20 has a high voltage amplification rate and there is no input offset voltage Vof at first input transistor 30a and second input transistor 30b, driving transistor 41 is controlled such that the voltage input to the inverted input terminal of amplifier 20 and the voltage input to its non-inverted input terminal are in agreement with each other, and a current flows in LED circuit 11 such that detection voltage VS is equal to reference voltage VR (VS=VR).

When input offset voltage Vof is not zero, detection voltage VS and reference voltage VR are not equal to each other. Here, the transistor on the non-inverted input terminal side has offset voltage Vof, and detection voltage VS generated in current detector 42 takes on the value obtained by adding error voltage VE to reference voltage VR (VS=VR+VE), the transistor on the non-inverted input terminal side and the transistor on the inverted input terminal side are swapped so that the transistor to which offset voltage Vof is input becomes the inverted input terminal side, and detection voltage VS appearing in current detector 42 takes on the value obtained by subtracting error voltage VE from reference voltage VR (VS=VR−VE).

FIG. 2 is a diagram illustrating the connection state in which first input transistor 30a is set as the inverted input terminal of amplifier 20, second input transistor 30b is set as the non-inverted input terminal of amplifier 20, detection voltage VS is input to first input transistor 30a, and reference voltage VR is input to second input transistor 30b. When input exchange circuit 27 and output exchange circuit 26 operate, while negative feedback is maintained, first input transistor 30a becomes the non-inverted input terminal of amplifier 20, second input transistor 30b becomes the inverted input terminal of amplifier 20, reference voltage VR is input to first input transistor 30a, and detection voltage VS is input to second input transistor 30b.

That is, input exchange circuit 27 and output exchange circuit 26 make it possible to exchange the transistors of the inverted input terminal and the non-inverted input terminal. When the transistors of the non-inverted input terminal and the inverted input terminal are swapped at a prescribed period, control is performed so that a detection voltage VS of VR+VE and of VR−VE appear alternately in current detector 42 at that period, so that on average the value is nearer to reference voltage VR than that when no swapping is performed.

Also, because first load transistor 31a and second load transistor 31b are swapped together with first input transistor 30a and second input transistor 30b, even when an error voltage is generated in current detector 42 due to disagreement between the characteristics of first load transistor 31a and second load transistor 30b, the error voltage still can be eliminated.

Figure 3:
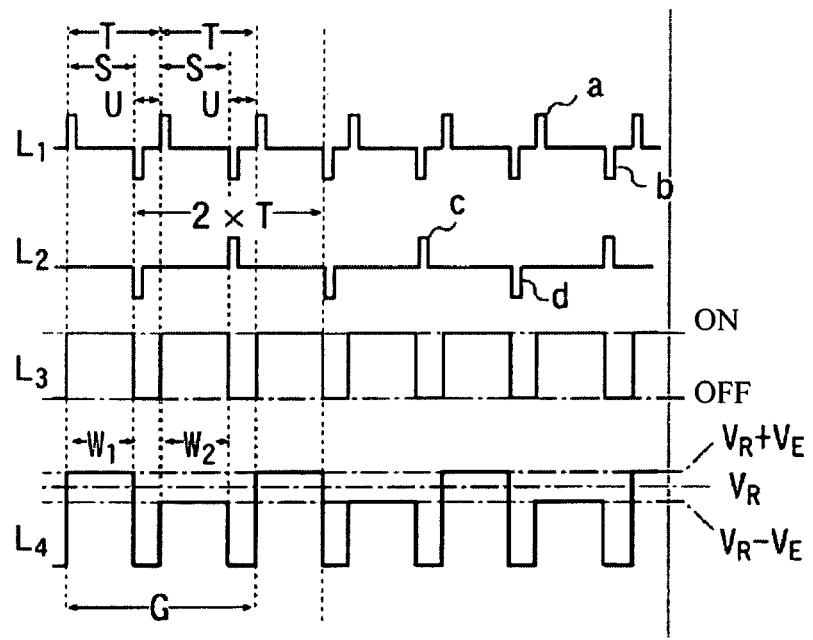
FIG. 3 is a timing chart illustrating the operation of the LED driver.
Figure 4:
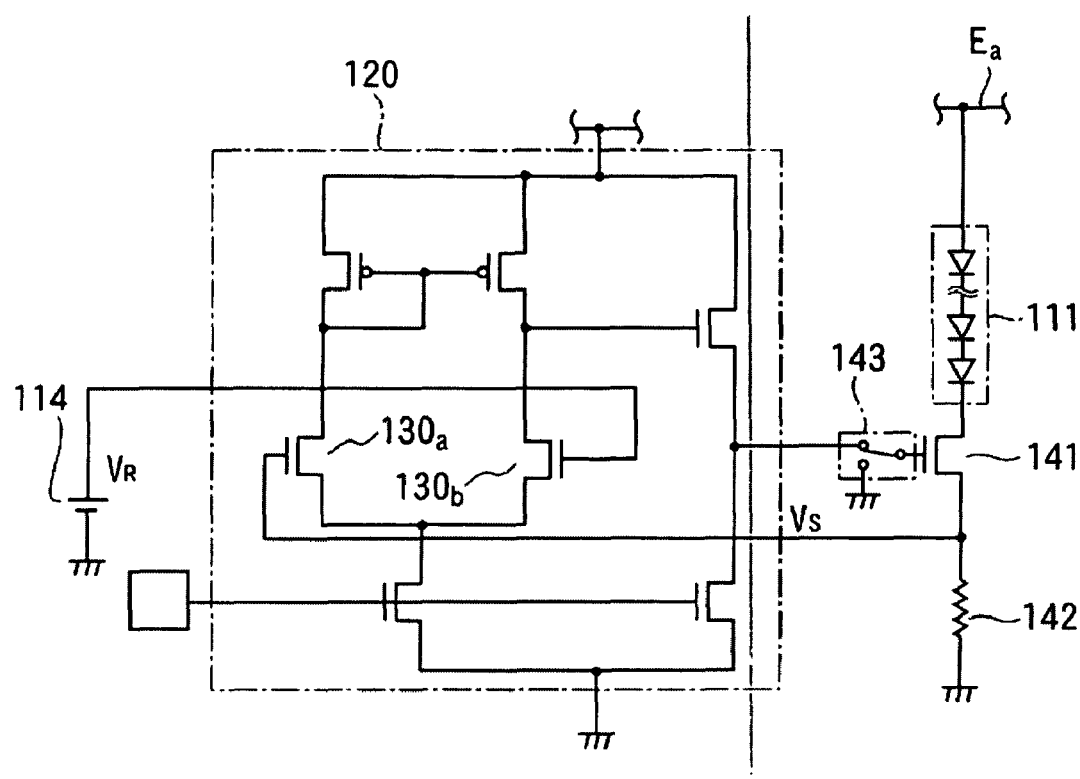
FIG. 4 is a circuit diagram illustrating the LED driver of the prior art.

In the following, the timing for swapping first input transistor 30a and second input transistor 30b will be explained. FIG. 3 is a timing chart illustrating the operation of brightness adjusting switch 43 and its relationship with the operation times of input exchange circuit 27 and output exchange circuit 26.

In LED backlight device 10 of the present invention, brightness adjusting switch 43 is controlled by PWM controller 16, and connection of the gate terminal of driving transistor 41 is switched between output circuit 24 and ground potential at nearly a constant frequency.

In the figure, key $L_1$ represents the operation timing chart for brightness adjusting switch 43. Upward timing (a) on the paper surface indicates the timing of switching from ground potential to output circuit 24, and downward timing (b) indicates the timing of switching from output circuit 24 to ground potential.

The period when the gate terminal of driving transistor 41 is connected to output circuit 24 is called the ON period, and the period when it is connected to ground potential is called the OFF period. In FIG. 3, key S indicates the ON period, while key U indicates the OFF period. Usually, the ON/OFF periods are swapped alternately at a prescribed period. In order to maintain a constant brightness of the LEDs, the duration of the ON period is subjected to PWM light adjustment control, so that the ON period is adjusted appropriately. Each cycle comprising an ON/OFF period can correspond to any frequency. For example, a constitution can be adopted in which it is synchronous with the horizontal synchronization signal or vertical synchronization signal as display control signals of the display. In this case, the ON period may be assigned to the horizontal blanking interval or vertical blanking interval. A scheme can also be adopted in which the horizontal synchronization period or vertical synchronization period is divided into plural periods, and said ON/OFF periods are synchronized with said divided periods.

Said exchange controller 13 can have a constitution in which input exchange circuit 27 and output exchange circuit 26 operate in one cycle at the start of the horizontal blanking interval or vertical blanking interval, and they do not operate during the period until the start of the next horizontal blanking interval or vertical blanking interval.

In FIG. 3, key $L_2$ represents the timing chart illustrating the operation of input exchange circuit 27 and output exchange circuit 26. Here, input exchange circuit 27 and output exchange circuit 26 operate with the timing indicated by letters (c) and (d) where the horizontal blanking interval or vertical blanking interval starts.

Consequently, during the ON period, one of the gate terminals of first input transistor 30a and second input transistor 30b is taken as the inverted input terminal, while the other remains as a non-inverted input terminal. In FIG. 3, key L3 shows the timing chart of the current waveform of LED circuit 11. Current flows in LED circuit 11 during the ON period and emits light. It is OFF during the OFF period.

In FIG. 3, key $L_4$ is a timing chart illustrating detection voltage VS.

In said timing chart $L_2$, key (c) upward on the paper sheet indicates the timing at which, the transistor among first input transistor 30a and second input transistor 30b that is receiving offset voltage Vof, is set as the non-inverted input terminal side of amplifier 20. In timing chart $L_4$ for detection voltage VS, the ON period starts after timing (c), and detection voltage VS has the value of VR+VE.

Key (d) represents the timing at which the transistor receiving offset voltage Vof is set as the inverted input terminal side of amplifier 20. The ON period starts after timing (d) so that detection voltage VS becomes VR−VE.

The duration of one group of ON/OFF periods is the operation period of brightness adjusting switch 43, as indicated by key T in FIG. 3. During each period, detection voltage VS has the value of VR+VE and the value of VR−VE. If the duration of the period for value VR+VE and that of the period for value VR−VE are equal, the average value of detection voltage VS becomes VR.

LED circuit 11 is ON during the ON period and OFF during the OFF period. ON/OFF happens repeatedly. In this case, if the time for each repetition is less than 1/60 sec, human eyes do not notice flickering. The apparent brightness corresponds to the ratio of ON/OFF periods.

Consequently, when the operating period G of brightness adjusting switch 43 is set to 1/60 sec or less, the voltage VR in current detector 42 is recognized as brightness when current flows.

The operation of input exchange circuit 27 and output exchange circuit 26 is synchronous with the start of the OFF period of brightness adjusting switch 43, that is, the horizontal blanking interval or vertical blanking interval. Consequently, the operating period of input exchange circuit 27 and output exchange circuit 26 is also shorter than 1/60 sec, and the voltages of the gate terminals of first input transistor 30a and second input transistor 30b are swapped at least once every 1/60 sec.

In this embodiment, p-channel MOS transistors are used as first load transistor 31a, second load transistor 31b, and output transistor 32, and n-channel MOS transistors are used as first input transistor 30a and second input transistor 30b. The present invention is not limited to this scheme, however. For example, the backlight device of the present invention can also be obtained by using n-channel MOS transistors as the first and second load transistors, and by using n-channel MOS transistors as the first and second input transistors. Also, it is not a requirement that input exchange circuit 27 and output exchange circuit 26 operate in each OFF period. They can also operate intermittently in the OFF period. For example, a constitution can also be adopted in which a cycle of operation is performed for every two or three horizontal blanking intervals or vertical blanking intervals.

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. A driver for a backlight device having an LED circuit comprising:
    an amplifier receiving a reference voltage at one input thereof for setting drive current to the LED circuit;
    a driver transistor coupled to an output of the amplifier and the LED circuit for controlling current flow in the LED circuit;
    a current detector generating a detection voltage representative of current flow in the LED circuit, the detection voltage coupled to a second input of the amplifier, the amplifier controlling the driver transistor to reduce a difference between the reference voltage and the detection voltage;

said amplifier comprises a first input transistor and a second input transistor; and an input exchange circuit that inputs said detection voltage to the gate terminal of one input transistor among said first input transistor and second input transistor, and inputs said reference voltage to the other input transistor;

and an exchange controller, which is coupled to said input exchange circuit, controls said input exchange circuit, causes said detection voltage to be input to the input transistor having said reference voltage input to it among said first input transistor and said second input transistor, and causes said reference voltage to be input to the input transistor having said detection voltage input to it.

2. The driver for a backlight device described in claim 1 wherein said amplifier further comprising:

a load circuit having a first load transistor and a second load transistor that have their gate terminals connected to each other and have their drain terminals connected to the drain terminals of said first transistor and said second transistor, respectively; and an output exchange circuit causes the drain terminals and gate terminals of said first load transistor and second load transistor to be connected to each other or disconnected from each other.

3. The driver for a backlight device described in claim 2 wherein the reference voltage and the detection voltage input to the first input transistor and the second input transistor are swapped at least once per 1/60 sec.

4. The driver for a backlight device described in claim 1 wherein the reference voltage and the detection voltage input to the first input transistor and the second input transistor are swapped at least once per 1/60 sec.

5. The driver for a backlight device described in claim 4 further comprising:

a brightness adjusting switch, which is arranged between the amplifier and the gate terminal of the driving transistor, and which switches the connection state between the amplifier and the driving transistor ON/OFF, and a brightness controller, which controls the operation of the brightness adjusting switch;

the exchange controller is constituted such that the detection voltage and the reference voltage input to the first input transistor and second input transistor are swapped during the period when the connection between said amplifier and the driving transistor is turned OFF.

6. A light-emitting element driver for driving a light-emitting element for backlighting a display, comprising:

a transistor, which is coupled to a current path of the light-emitting element and controls power ON for the light-emitting element;

a detector, which is coupled to the current path of the light-emitting element and detects the current flowing in the light-emitting element;

a driving signal generator, into which a detection voltage generated by the detector and a reference voltage are input, and which generates a driving signal for driving the transistor;

and a switching circuit, which is coupled between the driving signal generator and the transistor, and which selectively feeds the driving signal to the control terminal of the transistor;

the driving signal generator comprising:

a first input terminal and a second input terminal, an output terminal, a differential circuit containing a first transistor and a second transistor, a load circuit coupled to the differential circuit, a first switching circuit containing a first switch that causes the control terminal of the first transistor to be connected to the first input terminal or the second input terminal, and a second switch that causes the control terminal of the second transistor to be connected to the second input terminal or the first input terminal, and a second switching circuit containing a third switch that receives the output signal fed from the first node or second node between said differential circuit and the load circuit, and sends it to the output terminal;

the connection states of said first switch, second switch and third switch are switched during OFF period of the light-emitting element.

7. The light-emitting element driver described in claim 6 wherein:

said load circuit contains a third transistor coupled to said first node and a fourth transistor coupled to said second node;

the second switching circuit contains a fourth switch for connecting the first transistor or second transistor to a diode;

when the first switch connects the control terminal of the first transistor to the second input terminal, and the second switch connects the control terminal of the second transistor to the first input terminal, the third switch receives the output signal from the second node, and the fourth switch connects the third transistor to the diode;

when the first switch connects the control terminal of the first transistor to the first input terminal, and the second switch connects the control terminal of the second transistor to the second input terminal, the third switch receives the output signal from the first node, and the fourth switch connects the fourth transistor to the diode.

8. The light-emitting element driver described in claim 7 further comprising a switch controller for controlling the connection state of the first, second, third and fourth switches.

9. The light-emitting element driver described in claim 8 wherein the driving signal generator also has an output circuit coupled between the third switch and the output terminal.

10. The light-emitting element driver described in claim 8 wherein switching of the connection state of the switches is performed intermittently during plural OFF periods of the light-emitting element.

11. The light-emitting element driver described in claim 8 wherein each period comprising the ON/OFF periods of the light-emitting element is synchronized with the horizontal synchronization signal or vertical synchronization signal of the display control signal.

12. The light-emitting element driver described in claim 7 wherein the driving signal generator also has an output circuit coupled between the third switch and the output terminal.

13. The light-emitting element driver described in claim 7 wherein switching of the connection state of the switches is performed intermittently during plural OFF periods of the light-emitting element.

14. The light-emitting element driver described in claim 7 wherein each period comprising the ON/OFF periods of the light-emitting element is synchronized with the horizontal synchronization signal or vertical synchronization signal of the display control signal.

15. The light-emitting element driver described in claim 6 wherein the driving signal generator also has an output circuit coupled between the third switch and the output terminal.

16. The light-emitting element driver described in claim 15 wherein switching of the connection state of the switches is performed intermittently during plural OFF periods of the light-emitting element.

17. The light-emitting element driver described in claim 15 wherein each period comprising the ON/OFF periods of the light-emitting element is synchronized with the horizontal synchronization signal or vertical synchronization signal of the display control signal.

18. The light-emitting element driver described in claim 6 wherein switching of the connection state of the switches is performed intermittently during plural OFF periods of the light-emitting element.

19. The light-emitting element driver described in claim 18 wherein each period comprising the ON/OFF periods of the light-emitting element is synchronized with the horizontal synchronization signal or vertical synchronization signal of the display control signal.

20. The light-emitting element driver described in claim 6 wherein each period comprising the ON/OFF periods of the light-emitting element is synchronized with the horizontal synchronization signal or vertical synchronization signal of the display control signal.

* * * * *